Oct. 5, 1943.                L. PFISTERER                2,331,081
                      HEATER FOR STOCK WATERING TANKS
                           Filed March 12, 1941
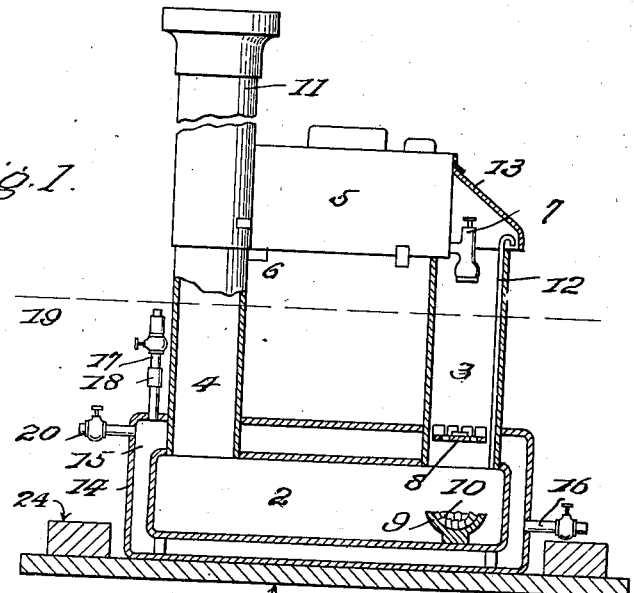
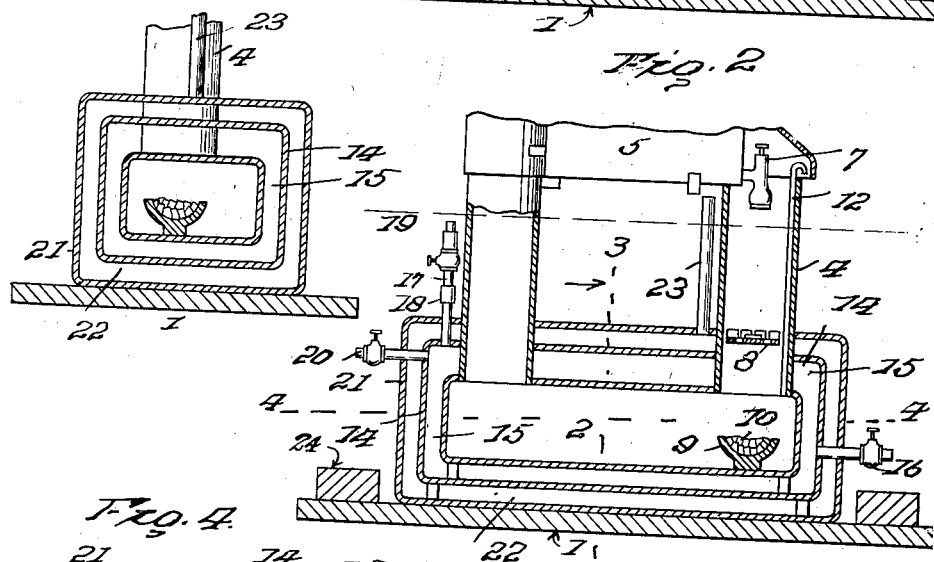
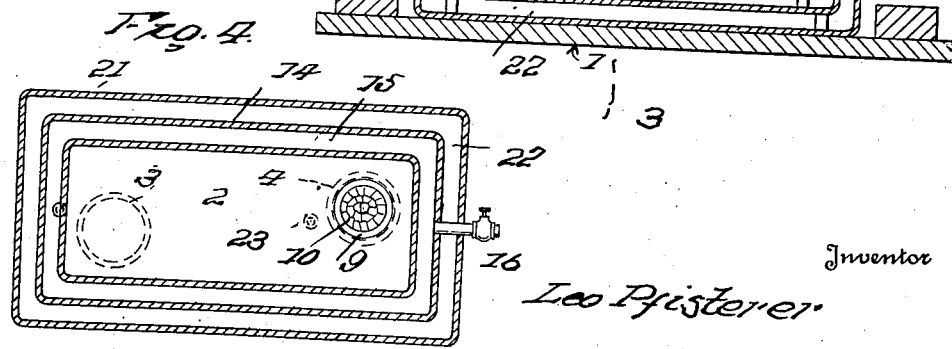
Inventor
Leo Pfisterer
By
                Attorney Patented Oct. 5, 1943

2,331,081

UNITED STATES PATENT OFFICE 2,331,081

HEATER FOR STOCK WATERING TANKS

Leo Pfisterer, Gordon, Nebr.

Application March 12, 1941, Serial No. 383,006

2 Claims. (Cl. 126—360)

This invention is directed to an improvement in heaters for stock watering tanks or troughs, in the use of which the water in the trough or tank which is usually exposed to temperature changes, is heated to a degree to render the water properly available to the animal for drinking by melting any accumulated ice and bringing the water to a more acceptable drinking temperature.

Stock watering tanks or troughs are ordinarily disposed at different points on the ranch so that the cattle or other animals may have convenient access thereto at will. In cold weather the surface water in the tanks or troughs will freeze and even in the absence of freezing temperature, the water becomes so chilled that the animals will ordinarily refuse to drink. To overcome these disadvantages it has been heretofore proposed to provide stock watering tank heaters of various types which, when necessary, may be bodily placed in the water of the tank or trough, and which, when in place, has its outer wall more or less highly heated by the burning of fuel in the heater, with the heat of such wall utilized to heat the immediately surrounding water and, through the tendency of this water when heated to rise through the body of the water in the vicinity of the heater, attempt is made to bring the water, if merely chilled, to a drinkable temperature, or to melt the surface ice on the water, if any such has accumulated.

Experience has demonstrated that these heretofore proposed stock watering tank heaters lacked desirable efficiency, largely because such heaters act directly on that portion of the water in the tank immediately surrounding the heater, and as this very limited volume of water becomes heated to even a relatively small degree above that of the remaining water, such heated water rises in the volume of water in the tank and if the heater is submerged, which is usually the case, the relatively small volume of heated water comes into contact with the immediately overlying body of cold water which quickly dissipates the heat of the rising body of hot water and neutralizes to a large degree any heating effect thereof on the whole body of water in the tank.

The primary object of the present invention is the provision of a stock watering tank heater in which a relatively small body of the water in the tank is segregated from the tank water and highly heated by reason of such segregation, and then delivered from the heater to a point approximating the upper level of water in the tank. The segregated mass of water in the heater, according to the present invention, has a restricted inlet communicating with the water in the tank and a restricting outlet for delivering the highly heated water to, thus provide a circulation through the heater of the water of the tank through the heater, to ensure not only the heating of the water to a temperature above that possible with the conventional heater, but the delivery of that highly heated water to a point near the surface of the water in the tank to avoid, as far as possible, the cooling effect on the surrounding tank water upon the heated water, before the latter reaches the most effective area of use; that is, near the surface of the water in the tank.

The invention in general structure includes a more or less conventional heater to be placed in the water of the tank including a burner chamber in which fuel delivered from a tank, forming part of the heater, is burned, and a water receptacle surrounding the burner chamber in direct communication with the highly heated wall of the burner chamber, with such water chamber having an inlet communication with the water of the tank, preferably at the lowest point of the water chamber, and an outlet leading from the water chamber for the discharge of the heated water at a point approximately or slightly below the surface of the water in the tank, the outlet being designed for selective restriction in length to compensate for different water levels in the tank.

The invention further contemplates the provision of an air chamber surrounding the water chamber to insulate such water chamber from the direct effect of the surrounding cold water in the tank.

The invention is illustrated in the accompanying drawing, in which

Figure 1 is a central vertical section of one form of my invention.

Figure 2 is a similar section of another form of the invention.

Figure 3 is a cross section of same on the line 3—3 of Figure 2.

Figure 4 is a horizontal section on the line 4—4 of Figure 2.

For convenience in understanding the invention, the improved details may be described as applied to a more or less conventional stock watering tank heater, which, as herein illustrated, may be briefly described as follows.

This conventional type of heater comprises a base portion 1 providing what will be hereinafter termed the burner chamber 2. A fuel pipe 3 rises from and communicates with the burner chamber and diametrically opposite the pipe 3 a further exhaust pipe section 4 is in communication with the burner chamber. A fuel tank 5 is removably supported on brackets 6 on the pipe 4 and has an outlet controlled by a valve 7 by means of which the fuel from the tank 5 may be fed lengthwise the pipe 3, preferably in a series of drops. A splash plate 8 is arranged in the pipe 3 immediately above the burner chamber and supported on the bottom of the burner chamber is a basket 9 in which the loose portion of fire brick or like incandescent indicated at 10 are adapted to be placed. The fuel as delivered by the valve 7 falls onto the splash plate 8 and is spread and gravitates into the basket 9 and onto the incandescent material 10. When ignited, the incandescent material is brought to a point of incandescence very rapidly and the burner chamber is highly heated. When submerged in the stock water tank, the outer wall of the burner chamber will heat the surrounding water, which water, as it is heated, rises in the water of the tank toward the upper surface. The pipe 4 may be provided with an extension 11 of sufficient height to extend above the level of the water in the tank in order to permit escape of the products of combustion, and a pipe 12 is arranged adjacent the wall of fuel pipe 3, said pipe being open at the lower end to the burner chamber and opening at the upper end above the level of the water in the tank to admit the air necessary for combustion of the fuel. A door 13 may be provided to close the upper end of the pipe 3 overlying the valve 7 to permit convenient access to the valve when necessary to adjust the rate of fuel flow.

In this form of conventional heater, the water immediately surrounding the wall of the burner chamber is heated, but incident to that heated condition, will rise toward the upper surface of the water in the tank, with a view to heating that surface and more particularly dissipating any ice which may have accumulated. It is apparent that in this type of heater, the variation in the heat degree between the water heated by the burner chamber and the colder water surrounded by such heated water would, at best, be comparatively slight before the heated water would rise. Therefore, notwithstanding the heating capacity of the heater, the effective heating of the water is retarded due to the relatively limited time that the water under the heat of the burner chamber will remain in contact with that chamber, and the further fact that immediately beyond such burner chamber the heated water is subjected to the surrounding very much colder water, which, by reason of its very much larger volume and considerably lower temperature will further reduce the thermal effect of the rising water on the general mass of water in the tank.

The present invention is designed particularly to overcome these disadvantages and to not only provide a higher degree of heat in the water from the burner chamber, but also deliver that more highly heated water nearer the surface of the water in the tank under some degree of protection against the immediately surrounding cold water.

To this end, the invention contemplates the provision of a casing 14 which conforms with, completely surrounds, except for the pipes 3 and 4, and is spaced from, the burner chamber 2. The spacing of the casing 14 from the wall of the burner chamber defines what will be hereinafter termed the water chamber 15. This water chamber is provided with an inlet 16 at its lowest point which is in open communication with the water in the tank, and an outlet in the form of a pipe 17 leading from the highest point of the water chamber, preferably diametrically opposite the inlet. The pipe 17 is made up in separate sections connected by unions or other connections 18, so that this pipe section may be made of any desired length, in accordance with the level of the water in the tank, which is indicated generally at 19. The upper end of the pipe 17 is designed to terminate slightly below the level 19 of water in the tank, but by the disposition of this pipe in sections with the corresponding coupling of the sections in any desired relation, the outlet end of the pipe may be set at will or changed as desired, in accordance with the level of the water in the tank. All of the water chamber below the connection of the outlet 17 thereto is provided with a further valve-controlled outlet 20 which is designed to be normally closed, but which may be opened for the escape of the hot water in the event the water level of the tank reaches a level materially below the discharge from outlet 17, in order to provide for delivery of hot water near to, but below the surface of such low-level water.

In the form described, it will be noted that there is a restricted volume of water delivered from the tank water to the water chamber 15, and which, by reason of its restricted volume, is highly heated from the wall of the burner chamber and delivered in this heated condition, and while protected against the surrounding cold water as far as possible by the closed hot water delivery pipe 17, which opens only near the upper surface of the water in the tank. By reason of the restricted volume of water in the water chamber 15, and its extremely rapid heating by the burner chamber there is in effect a continuous or substantially continuous flow of water from the tank water through the inlet 16, through the water chamber 15, and through the outlet 17. As a matter of fact, under normal heating conditions, the cold water entering the inlet 16 becomes very highly heated before it reaches the outlet so that there is what may be termed a continuous circulation of water through the water chamber, and its delivery at substantially its maximum temperature to near the surface of the water in the tank.

By reason of this delivery of the highly heated water to point adjacent the surface of the water in the tank, there is a most effective result from such heated water in either bringing the surface of the water in the tank to a drinkable temperature, or, additionally, melting any accumulated ice on such tank water surface.

It will, of course, be apparent that the water inlet 16 to the water chamber 15 may serve as a drainage opening for any accumulated water in the water chamber when the heater is removed from the tank, and designed for storage or otherwise held for subsequent use.

The construction described provides a water heater for the particular purpose mentioned, which is extremely effective in ordinary drinking troughs or tanks, but where the tank is unusually large, some being, for example, 14 feet in diameter, it has been found that the volume of heated water delivered from the improved heater described is not as completely efficient in such large volumes of water as in smaller tanks. Obviously, any deficiency of this character may be largely overcome by subjecting the water in the water chamber 15 to a higher degree of heat.

This result is accomplished in the form illustrated in Figures 2, 3 and 4.

A second casing 21 is arranged to completely encircle the outer wall of the water chamber 15, this casing 21 being spaced from the water chamber to provide a relatively narrow enclosing air space which, by completely enveloping the water chamber, serves as a heat insulator and effectively protects the otherwise natural influence of cold water of the tank on the outer wall of the water chamber 15 in the form previously described. Of course, the air chamber 22 is formed to permit uninterrupted passage of the inlet 16, the connection of the outlet pipe 17, and connection of the low water level outlet 20. The air space 22 may be provided with a breather pipe 23, which leads above the level of the water of the tank. The pipe 23 terminates near the bottom of the fuel tank 5 and as close to the valve 7, to utilize the heat to warm the fluid in the tank when low grade oil is used. Thus the oil is maintained fluid for proper flow even if the temperature is low.

In this form of heater, it is quite apparent that the water in the water chamber will become more highly heated by the burner chamber by reason of the insulating protection of the air chamber. Therefore, the water rising through the outlet 17 will be more highly heated and thus more effective in its results where the volume of the water in the tank is unusually large.

The heater is a complete unit, designed to be placed in the water in the watering tank or trough, preferably in the center of the water, and rests on the bottom of the tank or trough. Ordinarily, the water of the heater will hold it in place, but in order to avoid its displacement, under the agitation of the water by the animals in drinking, the base 1 may be extended beyond the heater proper to receive appropriate weights 24, as shown in Figures 1 and 2.

It is to be understood that the description herein of the conventional type of heater which the present invention is designed to improve is merely for the purpose of a better understanding of the invention, and the details of the invention as described are designed to be applied to any type of stock watering tank or trough heater to which they are applicable,—any changes in the specific relation of the parts made necessary by a variation in the conventional type of heater employed from that described, being contemplated, within the spirit of the present invention.

What is claimed as new is:

1. A water heater for water-containing stock tanks, comprising a unit to be removably submerged in the water of, and rest on the bottom of, the tank, said unit including a completely submerged burner chamber, a burner in the chamber, means for delivering fuel to said burner, an exhaust pipe leading from the burner chamber, a water-receiving chamber of materially-restricted volume as compared to that of the tank, said chamber including a wall completely surrounding and spaced from the wall of the burner chamber, means for admitting water to the water chamber from the tank, and means for delivering heated water from the water chamber to the water of the tank near its surface, the water in the water-chamber defining a materially restricted isolated volume of tank water to be quickly and highly heated by the heat of the burner chamber and to be distributed in such highly heated condition to a particular area of the tank water, whereby to more rapidly subject a selected area of tank water to a desired temperature than would be possible if the entire volume of tank water was subjected to a similar heat for the same period.

2. A construction as defined in claim 1, wherein a second chamber is provided, said second chamber including a wall completely surrounding the water chamber in relatively narrow spaced relation thereto, said second chamber being closed against the water of the tank and against the water of the water chamber, whereby to provide a dead-air insulating area between the heated water in the water chamber and the relatively colder water in the tank.

LEO PFISTERER.